US008806632B2

(12) United States Patent
Stefanidakis et al.

(10) Patent No.: US 8,806,632 B2
(45) Date of Patent: Aug. 12, 2014

(54) SYSTEMS, METHODS, AND DEVICES FOR DETECTING SECURITY VULNERABILITIES IN IP NETWORKS

(75) Inventors: Charles K. Stefanidakis, Newbury, MA (US); Richard Person, Newburyport, MA (US); Anish Dhanda, Cambridge, MA (US); Gregory Sabatino, Cambridge, MA (US); John J. Donovan, Hamilton, MA (US)

(73) Assignee: Solarwinds Worldwide, LLC, Austin, TX (US)

( * ) Notice: Subject to any disclaimer, the term of this patent is extended or adjusted under 35 U.S.C. 154(b) by 537 days.

(21) Appl. No.: 12/581,534

(22) Filed: Oct. 19, 2009
(Under 37 CFR 1.47)

(65) Prior Publication Data
US 2010/0169975 A1 Jul. 1, 2010

Related U.S. Application Data

(63) Continuation-in-part of application No. 12/361,501, filed on Jan. 28, 2009, now abandoned.

(60) Provisional application No. 61/115,422, filed on Nov. 17, 2008, provisional application No. 61/146,230, filed on Jan. 21, 2009.

(51) Int. Cl.
*H04L 29/06* (2006.01)

(52) U.S. Cl.
USPC .............................................. 726/23; 726/25

(58) Field of Classification Search
None
See application file for complete search history.

(56) References Cited

U.S. PATENT DOCUMENTS

| 7,382,244 B1 | 6/2008 | Donovan et al. |
| 7,500,266 B1 | 3/2009 | Vukelich et al. |
| 7,523,504 B2 * | 4/2009 | Shah .............................. 726/25 |
| 7,757,285 B2 * | 7/2010 | Kubota ........................... 726/23 |
| 8,042,187 B2 * | 10/2011 | Cain ................................ 726/25 |
| 8,272,061 B1 * | 9/2012 | Lotem et al. .................... 726/25 |
| 2002/0078381 A1 | 6/2002 | Farley et al. |
| 2004/0008681 A1 | 1/2004 | Govindarajan et al. |
| 2004/0044912 A1 | 3/2004 | Connary et al. |
| 2004/0071311 A1 * | 4/2004 | Choi et al. .................... 382/100 |
| 2004/0193943 A1 | 9/2004 | Angelino et al. |
| 2005/0102704 A1 | 5/2005 | Prokupets et al. |
| 2005/0158031 A1 | 7/2005 | David |
| 2005/0193429 A1 | 9/2005 | Demopoulos et al. |
| 2006/0010493 A1 | 1/2006 | Piesco et al. |
| 2006/0041754 A1 | 2/2006 | Hind et al. |
| 2007/0240213 A1 | 10/2007 | Karam et al. |
| 2008/0155694 A1 | 6/2008 | Kwon et al. |
| 2008/0201780 A1 | 8/2008 | Khan et al. |
| 2010/0095381 A1 * | 4/2010 | Levi ............................... 726/25 |

* cited by examiner

*Primary Examiner* — David Pearson

(74) *Attorney, Agent, or Firm* — Squire Sanders (US) LLP

(57) ABSTRACT

This invention is a system, method, and apparatus for detecting compromise of IP devices that make up an IP-based network. One embodiment is a method for detecting and alerting on the following conditions: (1) Denial of Service Attack; (2) Unauthorized Usage Attack (for an IP camera, unauthorized person seeing a camera image); and (3) Spoofing Attack (for an IP camera, unauthorized person seeing substitute images). A survey of services running on the IP device, historical benchmark data, and traceroute information may be used to detect a possible Denial of Service Attack. A detailed log analysis and a passive DNS compromise system may be used to detect a possible unauthorized usage. Finally, a fingerprint (a hash of device configuration data) may be used as a private key to detect a possible spoofing attack. The present invention may be used to help mitigate intrusions and vulnerabilities in IP networks.

12 Claims, 11 Drawing Sheets

SYSTEMS, METHODS, AND DEVICES FOR DETECTING SECURITY VULNERABILITIES IN IP NETWORKS

CROSS-REFERENCE TO RELATED APPLICATIONS

This patent application is a continuation-in-part of U.S. application Ser. No. 12/361,501, filed in the U.S. Patent and Trademark Office on Jan. 28, 2009, which claims the benefit of U.S. Ser. No. 61/146,230, filed on Jan. 21, 2009 and U.S. Ser. No. 61/115,422, filed on Nov. 17, 2008, the entire contents of each of these applications being incorporated herein by reference in its entirety.

FIELD OF THE INVENTION

The present invention is generally related to the security of IP-based networks and devices. More specifically, this invention relates to a system, method, and apparatus for detecting compromise of IP devices that make up a security and surveillance system, IP devices in commercial installations, and in general compromise of any IP network. The present invention may be used to help mitigate intrusions and vulnerabilities in IP networks.

BACKGROUND OF THE INVENTION

IP devices and IP networks have infiltrated every sector of civilian and commercial use. For example, airports, college campuses, and corporations have installed IP cameras for video surveillance. Hospitals are using IP-connected ECG monitors and other critical healthcare devices. However, while increasing security and improving quality of life, the proliferation of these IP devices has opened a new security vulnerability.

For example, "according to the U.S. Federal Aviation Administration, the new Boeing 787 Dreamliner aeroplane may have a serious security vulnerability in its on-board computer networks that could allow passengers to access the plane's control systems." (Dean Pullen, The Inquirer, "New Boeing 787 vulnerable to hacking," Jan. 6, 2008.)

In another example, " . . . a greater focus on airport security . . . [has led to] growing deployment of advanced IP-based video surveillance systems . . . . However, when handled with insufficient attention and prudence, technology can become a double-edged sword. Despite their undisputed advantages, IP-based surveillance systems also entail grave risks that are not relevant in analog systems . . . . The fact is, IP cameras function as guards, but are often not sufficiently guarded themselves. The critical question then becomes who guards the guards?" (Lior Frenkel, Security Products, "Unidirectional connectivity protects airport networks using IP cameras," Sep. 1, 2008.)

In yet another example, in the New York Times, a survey found that "Despite industry efforts to Lock down DNS servers, one in four remain vulnerable to cache poisoning due to the well-documented Kaminsky flaw identified earlier this year and another 40% could be considered a danger to themselves and others, recent research shows." (Denise Dubie, The New York Times, "1 in 4 DNS Servers Still Vulnerable to Kaminsky Flaw," Nov. 10, 2008)

Therefore, as recognized by the present inventors, what are needed are a method, apparatus, and system of detecting and alerting on security breaches and potential security vulnerabilities in IP networks.

It is against this background that various embodiments of the present invention were developed.

BRIEF SUMMARY OF THE INVENTION

One embodiment of the present invention is a method for detecting and alerting on the following conditions:
1. Denial of Service Attack
2. Unauthorized Usage Attack (for an IP camera, unauthorized person seeing a camera image)
3. Spoofing Attack (for an IP camera, authorized person seeing substitute images)

The present inventors recognize that numerous causes of the above conditions are possible ("attack vectors"). Likewise, numerous detectors for each of the above conditions have been invented by the present inventors. Some of the methods described here can detect all, or a large subset, of the possible attack vectors. Other methods described here are specifically designed to catch a critical attack vulnerability (a specific attack vector), such as the Kaminsky flaw for DNS servers. In all, the present invention is not limited to any one of the specific methods shown or described here. The key inventive concept of the present invention is the ability to catch an entire spectrum of IP network vulnerabilities, and the flexibility to easily add detectors for other vulnerabilities as they are discovered. Accordingly, the present invention is comprised of various alternative methods for detecting one or more causes of the above conditions.

According to one aspect of the present invention, a survey of services running on the IP device, historical benchmark data, and traceroute information is used to detect a possible Denial of Service Attack.

According to another aspect of the present invention, log analysis based on whitelist/blacklist as well as correlations of unusual events are use used to detect unauthorized usage.

According to another aspect of the present invention, a passive DNS compromise system as detailed in provisional U.S. Ser. No. 61/115,422 (incorporated herein by reference) is used to detect unauthorized usage.

According to yet another aspect of the present invention, a fingerprint is used as a private key to detect spoofing. Fingerprinting can be performed on the HTTP server running on many IP devices, on the TCP/IP stack or OS stack, or on lower level network address information. Fingerprinting can also be performed on configuration items, and then verified against a hash of the full configuration outputs.

According to yet another aspect of the present invention, watermarking of data streams may be used to detect spoofing.

Finally, according to yet another aspect of the present invention, a unique private key may be burned into the device's physical memory as a way to detect and prevent spoofing.

Other embodiments of the present invention include the systems corresponding to the methods described above, the apparatus corresponding to the methods above, and the methods of operation of such systems. Other features and advantages of the various embodiments of the present invention will be apparent from the following more particular description of embodiments of the invention as illustrated in the accompanying drawings.

BRIEF DESCRIPTION OF THE DRAWINGS

The figures attached hereto are illustrative of various aspects of various embodiments of the present invention, in which.

DETAILED DESCRIPTION OF THE INVENTION

Figure 1:
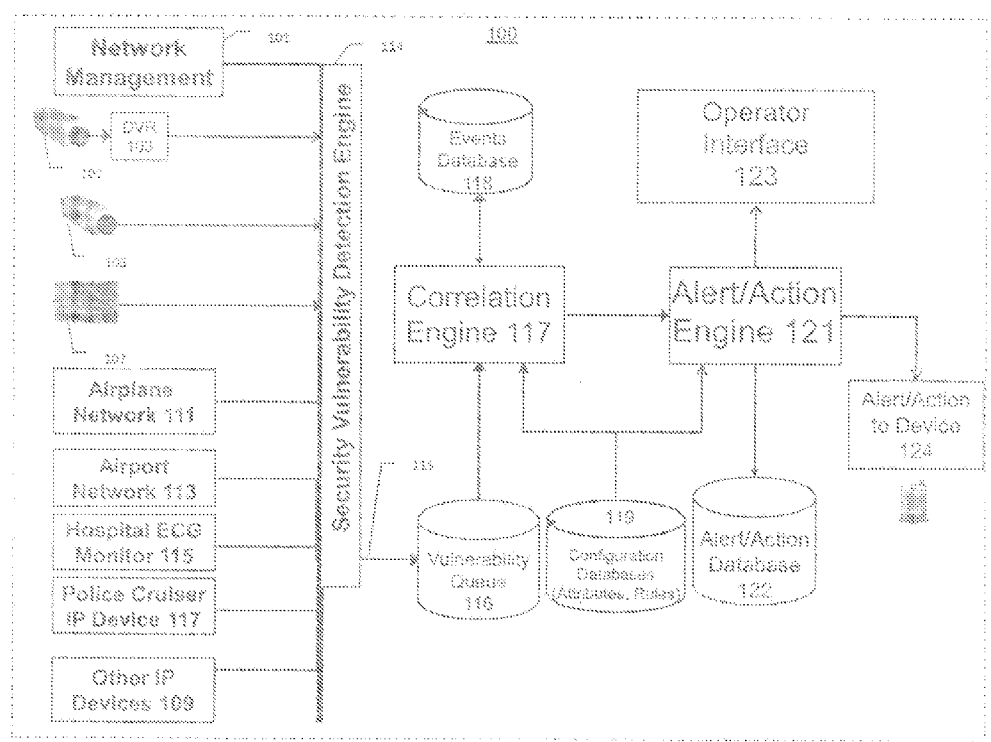
FIG. 1 illustrates a system architecture of one embodiment of the present invention.

The present invention provides for a system, method, and apparatus for detecting compromise of IP devices that make up an IP-based network.

Definitions

As used in this Detailed Description of the Invention, the term "IP" shall mean "Internet Protocol." The Internet Protocol (IP) is a protocol used for communicating data across a packet-switched internetwork using the Internet Protocol Suite, also referred to as TCP/IP. IP is the primary protocol in the Internet Layer of the Internet Protocol Suite and has the task of delivering distinguished protocol datagrams (packets) from the source host to the destination host solely based on their addresses. For this purpose the Internet Protocol defines addressing methods and structures for datagram encapsulation. The first major version of addressing structure, now referred to as Internet Protocol Version 4 (IPv4) is still the dominant protocol of the Internet, although the successor, Internet Protocol Version 6 (IPv6) is being actively deployed worldwide. The design principles of the Internet protocols assume that the network infrastructure is inherently unreliable at any single network element or transmission medium and that it is dynamic in terms of availability of links and nodes. No central monitoring or performance measurement facility exists that tracks or maintains the state of the network. For the benefit of reducing network complexity, the intelligence in the network is purposely mostly located in the end nodes of each data transmission. Routers in the transmission path simply forward packets to next known local gateway matching the routing prefix for the destination address.

As used herein, a "primitive event" is an atomic, indivisible event from any subsystem. For example, the network management module generates network events corresponding to network occurrences, such as a camera losing network connection, a storage device going down, etc.

As used herein, "compound events" shall include events that are composed of one or more primitive events.

As used herein, "correlated events" shall include primitive and/or compound events that have been correlated across either space or time.

As used herein, the term "meta-data" shall designate data about data. Examples of meta-data include primitive events, compound events, correlated events, network management events, etc.

As used herein, the term "video" shall mean video data alone, audio data alone, as well as audio-visual data (for example, interleaved audio and video). Any reference in this specification to the term "video" shall be understood to include video data alone, audio data alone, as well as audio-video data As used herein, the term "attribute data" shall designate data about IP devices, such as the quality of the data produced by the IP device, the age of the IP device, time since the IP device was last maintained, integrity of the IP device, reliability of the IP device, and so on. Attribute data has associated weights. For example, maintenance attribute data would have a lower weight for an IP device that was not maintained in the last 5 years compared to an IP device that is regularly maintained every 6 months. Attribute data includes "attributes," which are attributes of the IP devices, and their associated "weights, or weight functions" which are probabilistic weights attached to data generated by the IP devices. For example, an attribute would be "age of the device," and an associated weight function would be a function decreasing with age. Some weights may also change with external events, such as maintenance, time, and so on. For example, a weight associated with an IP device may go down if the IP device was not maintained for a period of time and go back up after that IP device is maintained. Attribute data may be determined by a system administrator, and/or determined heuristically.

Meta-data (primitive events, compound events, correlated events, etc.) and attribute data are used throughout the present invention. Meta-data in the form of primitive events is used to detect compound events of higher value. Primitive and compound events are correlated across space and time to generate additional meta-data of even higher value. The events are weighted according to the attribute data corresponding to the device that generated the events. Primitive, compound, and correlated events may trigger one or more intelligent alerts to one or more destinations.

System Architecture

The entire contents of each of U.S. Pat. No. 7,382,244 entitled VIDEO SURVEILLANCE, STORAGE, AND ALERTING SYSTEM HAVING NETWORK MANAGEMENT, HIERARCHICAL DATA STORAGE, VIDEO TIP PROCESSING, AND VEHICLE PLATE ANALYSIS, and U.S. Pat. No. 7,460,149 entitled VIDEO DATA STORAGE, SEARCH, AND RETRIEVAL USING META-DATA AND ATTRIBUTE DATA IN A VIDEO SURVEILLANCE SYSTEM are incorporated herein by reference in their entirety.

One embodiment of the present invention is a system, a method, and an apparatus for detecting and alerting compromise of an IP-based network. FIG. 1 shows an example of a system architecture 100 of one embodiment of the present invention. A network management module 101 monitors the health, status, and network connectivity of all components and subsystems of the system. The network management module monitors not only the devices, such as IP devices 109, but also monitors the functional blocks such as the correlation engine for operation. The network management module generates network events reflective of the network status of all subsystems. For example, the network management module sends a network event indicating "connection lost to camera 1" when the network management module detects a network connection problem to camera 1. The network management module is described in greater detail with respect to FIG. 3.

Analogue surveillance camera 102 captures video data, which is digitized by DVR 103. Digital surveillance camera 105 (which could be an IP camera) also captures video data. Although only two surveillance cameras are shown, the present invention may be applied to any number and combination of analogue and digital surveillance cameras. Audio sensory devices 107 capture audio data. Airplane network 111 represents an IP network composed of IP devices on an airplane, as described in the Boeing example in the Background section of this application. Airport network 113 represents an IP network composed of IP devices used for security of airports. The hospital ECG monitor 115 represents an example of an IP-device used in the healthcare sector. Police cruiser IP device 117 represents an example of an IP-device being deployed by police departments across the country in their vehicles. One or more additional IP devices 109 are also on the network.

A Security Vulnerability Detection Engine 114 monitors the status of the IP devices 103, 105, 107, 109, 111, 113, 115, and 117 for security vulnerability via one or more of the methods described here. The Security Vulnerability Detection Engine is described in greater detail in connection with FIG. 4 below. Although one Security Vulnerability Detection Engine is illustrated in FIG. 1 for clarity, each type of IP device may have its own Security Vulnerability Detection Engine. The Security Vulnerability Detection Engine(s) monitor the IP device(s) and generates corresponding vulnerability events for processing by the correlation engine. Vulnerability events 115 are placed in vulnerability queue 116 for processing by correlation engine 117.

Correlation engine 117 takes vulnerability events from vulnerability queue 116 and performs a series of correlations (across both space and time) on the vulnerability events that are described in greater detail below. After the vulnerability events are picked off from the vulnerability event queue 116 by the correlation engine, they are placed in permanent storage in the events database 118. The correlation engine 117 also queries the events database 118 for historical events to perform the correlations described below. The correlation engine also receives input from the configuration database 119 which stores configuration information such as device "attribute data," rules, etc. The correlation engine 117 correlates two or more primitive events, combinations of primitive events and compound events, and combinations of compound events. The correlation engine is described in greater detail in relation to FIG. 2.

Alert/action engine 121 generates one or more alerts and performs one or more actions 124 based on the correlated events from the correlation engine. Examples of alerts include an email to a designated individual, an SMS message to a designated cell phone, an email to an Apple iPhone® or other multimedia-rich portable device, or an alert displayed on the operator's interface 123. Examples of actions include "reboot IP device," "turn IP device on or off," etc. Detailed examples of possible actions that may be performed by the alert/action engine 121 are described in greater detail below. Alert/action engine 121 stores all alerts/actions that were performed in alerts database 122.

In one application of the present invention to a video surveillance system, the cameras used may be digital IP cameras, digital PC cameras, web-cams, analog cameras, cameras attached to camera servers, analog cameras attached to DVRs, etc. Any camera device is within the scope of the present invention, as long as the camera device can capture video and is IP-addressable, either directly or indirectly through an intervening device such as an IP-DVR. Some cameras may have an integrated microphone. It is well understood that the system diagram shown in FIG. 1 is illustrative of only one implementation of the present invention.

As recognized by the present inventors, one embodiment of the present invention is a method for detecting and alerting on the following conditions:

1. Denial of Service Attack
2. Unauthorized Usage Attack (for an IP camera, unauthorized person seeing a camera image)
3. Spoofing Attack (for an IP camera, authorized person seeing substitute images)

The present inventors recognize that numerous causes of the above conditions are possible ("attack vectors"). Likewise, numerous detectors for each of the above conditions have been invented by the present inventors. Some of the methods described here can detect all, or a large subset, of the possible attack vectors. Other methods described here are specifically designed to catch critical attack vulnerabilities (specific attack vectors). In all, the present invention is not limited to any one of the specific methods shown or described here. The key inventive concept of the present invention is the ability to catch an entire spectrum of IP network vulnerabilities, and the flexibility to easily add detectors for other vulnerabilities as they are discovered. Accordingly, the present invention is comprised of various alternative methods for detecting one or more causes of the above conditions, which methods are detailed in the following sections.

Detecting Denial of Service (DOS) Attacks

Multiple methods of detecting DOS Attacks are possible. According to one aspect of the present invention, a survey of services running on the IP device may be used to detect Denial of Service, and to differentiate a DOS attack from a network outage. An IP device typically has multiple services running. For example, a typical IP camera (e.g., Axis 207W) has the following services running (this is not an exhaustive list):

1. Ping
2. SNMP (Simple Network Management Protocol)
3. HTTP (Hypertext Transfer Protocol) GET/POST/etc.)
4. FTP (File Transfer Protocol)
5. Telnet In one embodiment of the present invention, a virtual survey of the services running on the IP device is performed to detect a DOS attack. Each service is systematically queried for a data response or a data acknowledgement, such as an ACK-OK. For example, an ICM (ping) package, SNMP request, HTTP GET request, FTP GET request, or telnet request is performed on each service. Depending on the response from each service, survey is constructed showing which services successfully responded. This survey is used to detect DOS attacks. Accordingly, it is possible to distinguish between a network outage (such as would be typically reported by a network management application) and a DOS attack. In a network outage situation, the response to ping drops off suddenly and stays down. However, in a DOS attack, ping responses are intermittent.

According to another aspect of the present invention, historical benchmark data may be used to detect DOS attacks. Round-trip time to various IP devices is profiled historically for various protocols (HTTP, FTP, etc.). It has been discovered by the present inventors that these profiles are generally invariant under ordinary circumstances. During a change of network configuration, these profiles may change once and again remain invariant. However, under a DOS attack, the profile changes suddenly, dramatically, and intermittently from the expected historical benchmark profile. It is important when using historical benchmarks to periodically update or "refresh" the benchmarks.

According to another aspect of the present invention, traceroute information may be used to detect a possible DOS attack. A traceroute may be performed from the Security Vulnerability Detection Engine to each IP device. A traceroute works by increasing the "time-to-live" (TTL) value of each successive batch of packets sent. The first three packets sent have a time-to-live value of one (implying that they are not forwarded by the next router and make only a single hop). The next three packets have a TTL value of 2, and so on. When a packet passes through a host, normally the host decrements the TTL value by one, and forwards the packet to the next host. When a packet with a TTL of one reaches a host, the host discards the packet and sends an ICMP time exceeded (type 11) packet to the sender. Traceroute uses these returning packets to produce a list of hosts that the packets have traversed en route to the destination. The three time stamp values returned for each host along the path are the delay (latency) values, typically in milliseconds (ms), for each packet in the batch. If a packet does not return within the expected timeout window, a star (asterisk) is traditionally printed. Traceroute may not list the real hosts. It indicates that the first host is at one hop, the second host at two hops, etc. Internet Protocol does not guarantee that all the packets take the same route. Also note that if the host at hop number N does not reply, the hop will be skipped in the output.

In one illustrative example, the Security Vulnerability Detection Engine requests a traceroute to the IP of the device of interest. Assuming that the IP address of the machine running the Security Vulnerability Detection Engine is 195.80.96.219, and the IP address of the device of interest is 130.94.122.199, the Security Vulnerability Detection Engine issues the following command:

traceroute 195.80.96.219 130.94.122.199

Sample output of the above command is shown here for illustration:

```
* 1 195.80.96.219
* 2 kjj-bb2-fe-0-1-4.ee.estpak.ee
* 3 noe-bb2-ge-0-0-0-1.ee.estpak.ee
* 4 s-b3-pos0-3.telia.net
* 5 s-bb1-pos1-2-0.telia.net
* 6 adm-bb1 -pos1 -1-0. telia.net
* 7 adm-b1-pos2-0.telia.net
* 8 p4-1-2-0.r00.amstn102.nl.bb.verio.net
* 9 p4-0-3-01.r01.amstn102.n1.bb.verio.net
* 10 p4-0-1-0.r80.nwrknjOl.us.bb.verio.net
* 11 p4-0-3-0.r00.nwrknj01 .us.bb.verio.net
* 12 p16-0-1 -1.r20.mlpsca01 .us .bb .verio.net
* 13 xe-1-2-0.r21.mlpsca01.us.bb.verio.net
* 14 xe-0-2-0.r21.snjsca04.us.bb.verio.net
* 15 p64-0-0-0.r21.1sanca01.us.bb.verio.net
* 16 p16-3-0-0.r01.sndgca01.us.bb.verio. net
* 17 ge-1-2.a03.sndgca01.us.da.verio.net
* 18 130.94.122.199
```

The above are just several illustrative embodiments of the DOS attack detector. Other DOS attack detectors are within the spirit and scope of the present invention.

Detecting Unauthorized Usage

According to one aspect of the present invention, unauthorized usage may be detected by reading and analyzing logs either in the device itself or in the nearest router. The logs can be analyzed by looking at whitelists/blacklists. For example, if an IP device was accessed from an IP on a blacklist, it is known that the IP device has had unauthorized usage. Conversely, if it is known from the log that an IP device was accessed from an IP on the whitelist, it is known that the IP device did not have unauthorized usage. If the IP address is on neither list, this may also be a potential threat, and in correlation with other events, may be determined as a high or low probability of being a real threat. If a particular threat is assigned a high probability by the correlation engine as being a real threat, it may be flagged and temporarily added to the blacklist until a definitive confirmation is made.

Logs can also be analyzed for unusual patterns using the correlation engine described above. All network activity is first logged to log files. The log files are then scanned either in real-time or forensically to look for unusual patterns. Some examples of unusual patterns that may be a sign of a DOS attack include multiple repeated failed attempts to login, multiple attempts to talk to services that are not being provided, the frequency and speed of data requests, and time patterns of login attempts. For example, an IP address on one of the blacklists is attempting to login at the same time every night.

Other alternatives for detecting unauthorized usage are also within the scope and spirit of the present invention.

Detecting Unauthorized Usage by Detecting DNS Server Compromise

According to another aspect of the present invention, a passive DNS compromise system as detailed in provisional U.S. Ser. No. 61/115,422 (incorporated herein by reference) may be used to detect signs of unauthorized usage.

DNS server compromise are a real security threat to IP networks. For example, as stated in the New York Times, one in four DNS servers is still vulnerable to the Kaminsky flaw (Denise Dubie, The New York Times, "1 in 4 DNS Servers Still Vulnerable to Kaminsky Flaw," Nov. 10, 2008).

Accordingly, one aspect of the present invention is to extend DNS server identification schemes. An IP device may be forced into exposing its DNS server in one of the following ways.

In one embodiment, a way to force an IP device to expose its DNS server is to:

Step 1) Security Vulnerability Detection Engine sends HTML to IP device containing an image that references a third-party hostname named after the IP device's source IP.

Step 2) The IP device hits third-party hostname, which exposes its DNS server.

Step 3) Third-party host sends information about IP device's DNS server to the Security Vulnerability Detection Engine.

Step 4) The Security Vulnerability Engine now knows the DNS server being used by the IP device, which it can then use for security purposes or can report to the IP device.

In another embodiment, it is actually possible to eliminate steps 1, 3, and 4 above as follows:

First, register a domain like dns-id.net or something similar. This domain would have a wildcard DNS entry sending *.dns-id.net to a web server. To get the DNS server currently in use, an IP device could embed the following two tags into a web page:

```
<i mg src="http://[random string].dns-id.net/bits0_8.png">
<i:mg src="http://[random string].dns-id.net/bits16_24.png"> . . .
``` in which [random string] is a random string, the same string used for both image links. The content of this string doesn't matter.

When the dns-id.net web server receives a request for these images, it looks through the logs of its DNS server to determine where the request for [random string].dns-id.net came from. It then serves up two blank transparent images, but whose width and height are bytes 0, 8, 16, and 24 of the IP address of the DNS server used for the request.

For example, if an IP device is using DNS server 66.83.39.4, the following images are generated:

| | | |
|---|---|---|
| bits0_8.png: | width: 4 | height: 39 |
| bits16_24.png: | width: 83 | height: 66 |

Since these are empty flat transparent images, the size of the image files is tiny. Using the width and height is just a way to smuggle back some data since it is not possible to do this with AJAX and XMLHttpRequest since that call has a same-site restriction enforced by the browser.

JavaScript code can then get the width and height of these dummy images, and can assemble the IP address. Thus, using this service, a webscript on any IP device can discover in a single operation the DNS server that was used to resolve its host.

In yet another embodiment, the concept can be generalized further for use on any IP device that has a DNS resolution mechanism as follows.

Step 1) Force a DNS lookup by the IP device by putting "[random string].dns-id.net" in a setting that can be triggered later, for example, the timeserver setting.

Step 2) Trigger a DNS server lookup by asking the IP device to activate that setting, for example, by asking the IP device to update its time.

Step 3) By using the mechanism described above, the Security Vulnerability Detection Engine can now determine the DNS server used by the IP device whose setting was set to "[random string].dns-id.net".

The above methods can be used to detect blacklisted or rogue DNS servers, for example in anti-phishing systems.

Detecting Spoofing

In the context of network security, a spoofing attack is a situation in which one person or program successfully masquerades as another by falsifying data and thereby gaining an illegitimate advantage. An example from cryptography is the man-in-the-middle attack, in which an attacker spoofs Alice into believing the attacker is Bob, and spoofs Bob into believing the attacker is Alice, thus gaining access to all messages in both directions without the trouble of any cryptanalytic effort.

The attacker must monitor the packets sent from Alice to Bob and then guess the sequence number of the packets. Then the attacker knocks out Alice with a SYN attack and injects his own packets, claiming to have the address of Alice. Alice's firewall can defend against some spoof attacks when it has been configured with knowledge of all the IP addresses connected to each of its interfaces. It can then detect a spoofed packet if it arrives at an interface that is not known to be connected to the IP address.

Many carelessly designed protocols are subject to spoof attacks, including many of those used on the Internet.

Another kind of spoofing is "webpage spoofing," also known as phishing. In this attack, a legitimate web page such as a bank's site is reproduced in "look and feel" on another server under control of the attacker. The intent is to fool the users into thinking that they are connected to a trusted site, for instance to harvest user names and passwords.

This attack is often performed with the aid of URL spoofing, which exploits web browser bugs in order to display incorrect URLs in the browsers location bar; or with DNS cache poisoning in order to direct the user away from the legitimate site and to the fake one (Kaminsky flaw). Once the user puts in their password, the attack-code reports a password error, then redirects the user back to the legitimate site.

More specifically, in computer networking, the term IP address spoofing refers to the creation of IP packets with a forged (spoofed) source IP address with the purpose of concealing the identity of the sender or impersonating another computing system.

The header of each IP packet contains, among other things, the numerical source and destination address of the packet. The source address is normally the address that the packet was sent from. By forging the header so it contains a different address, an attacker can make it appear that the packet was sent by a different machine. The machine that receives spoofed packets will send a response back to the forged source address, which means that this technique is mainly used when the attacker does not care about response or the attacker has some way of guessing the response.

In certain cases, it might be possible for the attacker to see or redirect the response to their own machine. The most usual case is when the attacker is spoofing an address on the same LAN or WAN.

IP spoofing is often used in combination with Denial of Service attacks. In such attacks, the goal is to flood the victim with overwhelming amounts of traffic, and the attacker does not care about receiving responses to their attack packets. Packets with spoofed addresses are thus suitable for such attacks. They have additional advantages for this purpose—they are more difficult to filter since each spoofed packet appears to come from a different address, and they hide the true source of the attack. Denial of service attacks that use spoofing typically randomly choose addresses from the entire IP address space, though more sophisticated spoofing mechanisms might avoid unroutable addresses or unused portions of the IP address space.

IP spoofing can also be a method of attack used by network intruders to defeat network security measures, such as authentication based on IP addresses. This method of attack on a remote system can be extremely difficult, as it involves modifying thousands of packets at a time. This type of attack is most effective where trust relationships exist between machines. For example, it is common on some corporate networks to have internal systems trust each other, so that a user can log in without a username or password provided they are connecting from another machine on the internal network (and so must already be logged in). By spoofing a connection from a trusted machine, an attacker may be able to access the target machine without authenticating.

Configuration and services that are especially vulnerable to IP spoofing include:

1. RPC (Remote Procedure Call services)
2. Any service that uses IP address authentication
3. The X Window system
4. The R services suite (rlogin, rsh, etc.)

The term spoofing is also sometimes used to refer to header forgery, the insertion of false or misleading information in e-mail or netnews headers. Falsified headers are used to mislead the recipient, or network applications, as to the origin of a message. This is a common technique of spammers and sporgers, who wish to conceal the origin of their messages to avoid being tracked down. That is, the sender information shown in e-mails (the "From" field) can be spoofed easily.

Therefore, according to another aspect of the present invention, a fingerprint is used as a private key to detect spoofing. According to an invention concept of the present invention, spoofing can be detected in one or more of the following ways:

1. Fingerprinting of HTTP server (server headers, error page text, etc.)

2. Fingerprinting of TCP/IP stack or OS (response to IP behavior, etc.)
3. Fingerprinting lower-level network address information (such as MAC addresses)
4. Fingerprinting configuration items, and then verifying against a hash of the full configuration items
5. Watermarking of IP device data streams (for example, in an IP camera, watermarking the image)
6. Burning a unique private key in the device's physical memory Fingerprints can be generated from various aspects of an IP device, such as its HTTP headers, TCP/IP stock or OS, low-level network addresses, or configuration items. The main advantage of fingerprinting in detecting spoofing is that while a malicious hacker may change the data-stream to a data-stream that looks similar to the real data stream, it is very difficult for the hacker to identify and replicate the fingerprint itself.

According to one embodiment of the present invention, fingerprinting of the HTTP server, such as the server headers, error page text, etc. is used to detect potential spoofing of an IP device.

According to another embodiment of the present invention, fingerprinting of the TCP/IP stack or OS stack, such as the IP device's response to IP behavior, etc. is used to detect potential spoofing of an IP device.

According to yet another embodiment of the present invention, fingerprinting of the low-level network address information, such as the MAC address, etc. is used to detect potential spoofing of an IP device.

According to yet another embodiment of the present invention, fingerprinting of the configuration items, especially unused configuration items, such as descriptive data, etc. is used to detect potential spoofing of an IP device. Fingerprinting may be achieved by performing a hash of the configuration settings on an IP-device. In one embodiment of the invention, configuration settings that are either unused, or have no impact on the IP-device, (for example, descriptive data or meta-data) may be used for this purpose. One advantage of using the descriptive data is that this data is usually not used by any applications, and therefore may be randomly generated periodically to keep the fingerprint of each device "fresh."

According to yet another embodiment of the present invention, watermarking of IP device data streams, is used to detect potential spoofing of an IP device. For example, in an IP camera, watermarking the image may be used to detect potential spoofing, since the watermark would be both hidden and a secret key would make the watermark difficult for a hacker to reproduce.

Finally, according to yet another embodiment of the present invention, burning a unique private key in the device's physical memory (e.g., ROM), is used to detect potential spoofing of an IP device. One disadvantage of the last two approaches to spoofing detection is both may require cooperation from the device manufacturer to bum a watermark or a private key into the IP device ROM.

Various fingerprinting algorithms are within the scope of the present invention, and the present invention is not limited to any single fingerprinting algorithm. However, to serve its intended purposes, a fingerprinting algorithm must be able to capture the identity of the device configuration with virtual certainty. In other words, the probability of a collision—two random streams of device configurations yielding the same fingerprint—must be negligible, compared to the probability of other unavoidable causes of fatal errors (such as the system being destroyed by war or by a meteorite); say, $10^{-20}$ or less.

A fingerprinting algorithm may be a one-way hashing function with a very low collision frequency. This requirement is somewhat similar to that of a checksum function, but is much more stringent. To detect accidental data corruption or transmission errors, it is sufficient that the checksums of the original data and any corrupted version will differ with near certainty, given some statistical model for the errors. In typical situations, this goal is easily achieved with 16- or 32-bit checksums. In contrast, device fingerprints need to be at least 64-bit long to guarantee virtual uniqueness in systems with large numbers of devices.

Correlation Engine

Figure 2:
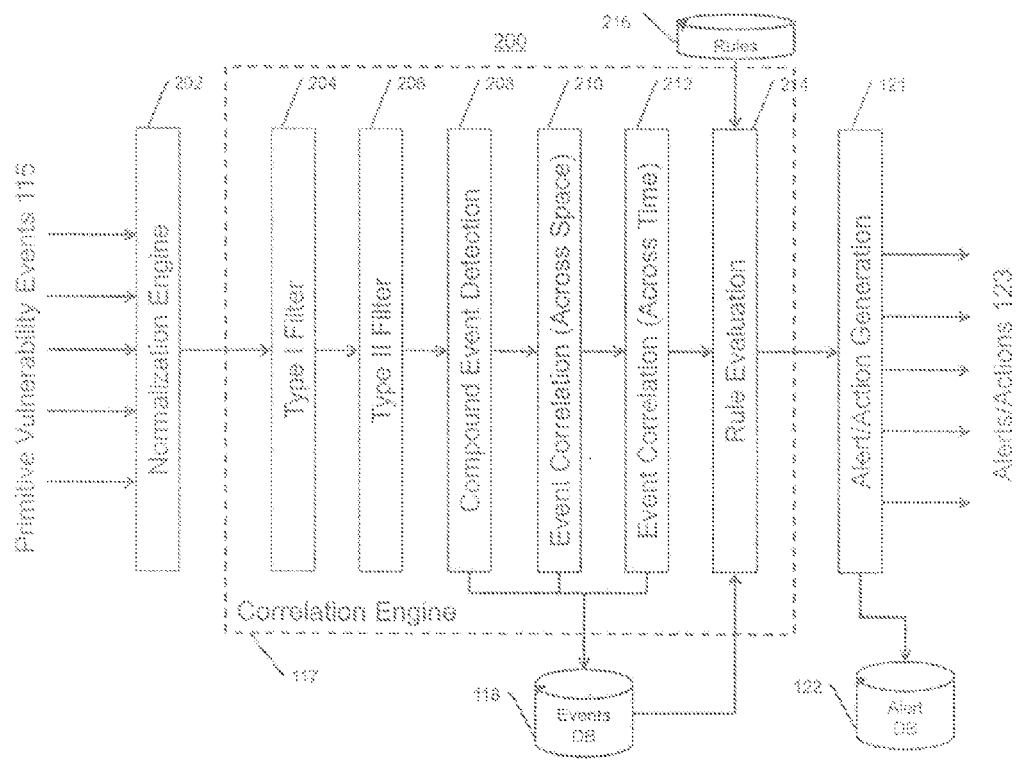
FIG. 2 illustrates a system architecture of a correlation engine according to one aspect of the present invention.

FIG. 2 shows an architecture 200 of the correlation engine 117 according to one embodiment of the present invention. Primitive vulnerability events 140 are received from one or more Security Vulnerability Detection Engines (which could be a separate vulnerability detector for each device type), and are normalized into a standard format by the normalization engine 114. A Type I Filter 204 filters out primitive events based on a set of Type I rules. The set of Type I rules instruct the system which events to store, and which events to ignore. A Type II filter 206 filters out primitive events based on a set of Type II rules. The set of Type II rules are defined by a system administrator, and are designed to customize the system to the business processes in which the present invention is being used. The set of Type II rules instruct the system which events to store, and which events to ignore to align the present system with business processes. This Type II filter eliminates unnecessary false alarms by disregarding events when they are not significant based on normal business processes.

After the primitive events have been filtered by Type I Filter 204 and Type II Filter 206, they are evaluated by compound event detection module 208 for presence of compound events. An example of a compound event is a "DNS cache poison." A compound event occurs when certain primitive vulnerability events are detected nearly simultaneously or contemporaneously. For example, a "DNS cache poison" compound event occurs when a DNS server is asked repeatedly to resolve a domain name that it does not have cached while simultaneously providing a wrong answer to the domain resolution. Compound events are defined by the system administrator as a combination of two or more primitive events. Compound events may include primitive vulnerability events from one IP device, from two or more IP devices, or even from two disparate types of IP devices.

After compound events have been detected from primitive events, the primitive and compound events are correlated across space by event correlation module 210. Event correlation across space module 210 looks for events occurring "substantially simultaneously" or in close time proximity, across multiple IP devices of varying types located across space. For example, a space correlation would occur when activity is detected from several countries known to have vulnerabilities simultaneously, a high volume of traffic is detected from these countries, and this is also the first time that requests have come from those particular countries. Next, the primitive and compound events are correlated across time by event correlation module 212. Event correlation across time module 212 looks for historical event correlations between events detected now, and events that occurred historically. For example, a time correlation would occur when suspicious requests were detected coming from an IP or physical address that was previously involved in a DNS cache poison attack.

At each detection of a compound event by compound event detection module 208, and each correlation across both space and time by event correlation modules 210 and 212, the compound events and correlated events are stored in events database 118. Rule evaluation module 214 evaluates a set of rules from rules database 216 based on the events stored in events database 118. Examples of event correlation and rule evaluation are described in greater detail below.

Finally, alert/action engine 121 issues one or more alerts or performs one or more actions 123 based on the rules evaluated by the rule evaluation module 214. The alerts/actions are stored in alerts database 122. One of ordinary skill will recognize that the architecture shown in FIG. 2 is illustrative of but one correlation engine architecture and is not intended to limit the scope of the correlation engine to the particular architecture shown and described here. A more detailed mathematical explanation of the operation of one embodiment the correlation engine is described in greater detail follows.

Event Correlation

One embodiment of the present invention allows real-time alerts to be issued based on the present and historical vulnerability data, and especially the present and historical vulnerability events. In one embodiment of the present invention, the correlation engine correlates vulnerability events, both present and historical, across multiple IP devices and multiple locations, and activates via the alert/action engine one or more actions in response to the correlation exceeding a particular threshold. As previously described, the correlation engine may evaluate various rules, such as "issue an alert to a given destination when a given vulnerability is detected in a given device class during a designated time." Security Vulnerability Detectors are used to detect vulnerability events in the IP devices, which are then input into the correlation engine. Input may also come from other systems, such as sensory devices (e.g., temperature and pressure probes). Various actions may be taken under certain conditions, and may be activated by the alert/action engine when a certain set of conditions are met.

In addition to alerting on the occurrence of primitive or compound events, the present invention may also alert based on an accumulated value of multiple events across space and time. Equations 1 to 3 show possible rules that may be evaluated by the correlation engine. For example, as shown in Eq. 1, action component $a_1$ will be activated if the expression on the left-hand side is greater than a predetermined threshold $t1$. In Eqs. 1-3, "a" stands for an action, "w" stands for attribute weights, "x" stands for one class of vulnerability events, and "v" stands for another class of vulnerability events. Eqs. 1-3 could represent a hierarchy of actions that would be activated for different threshold scenarios. Eqs. 1-3 are illustrative of only one embodiment of the present invention, and the present invention may be implemented using other equations and other expressions.

$$a_1: \sum_{i=1}^{i=N} w_i \cdot x_i + \sum_{i=1}^{m} w_i \cdot v_i \geq \tau_1$$

$$a_2: \sum_{i=1}^{i=N} w_1 \cdot x_i + \sum_{i=1}^{m} w_i \cdot v_i \geq \tau_2$$

$$a_n: \sum_{i=1}^{i=N} w_i \cdot x_i + \sum_{i=1}^{m} w_i \cdot v_i \geq \tau_n$$

Equation 4 shows an example of a calculation for determining weights. The weights "$w_i$" may be a weighted average of attribute data ($a_i$), including resolution of the data (R), age of the device used to capture the data (A), time since last maintenance of the device used to capture the data (TM), and reliability of the source of the video data (RS). Other weighting factors may also be used, and the weighing factors described here are illustrative only and are not intended to limit the scope of the invention.

$$w_i = \sum_{k=1}^{N} \omega_k a_k$$

In equation 4, $\omega_k$ are relative weights of the attributes ($a_k$), which are themselves weights associated with the data sources. The preceding equations are illustrative of but one manner in which the present invention may be implemented and are not intended to limit the scope to only these expression(s).

Security Vulnerability Detection Engine Architecture

Figure 4:
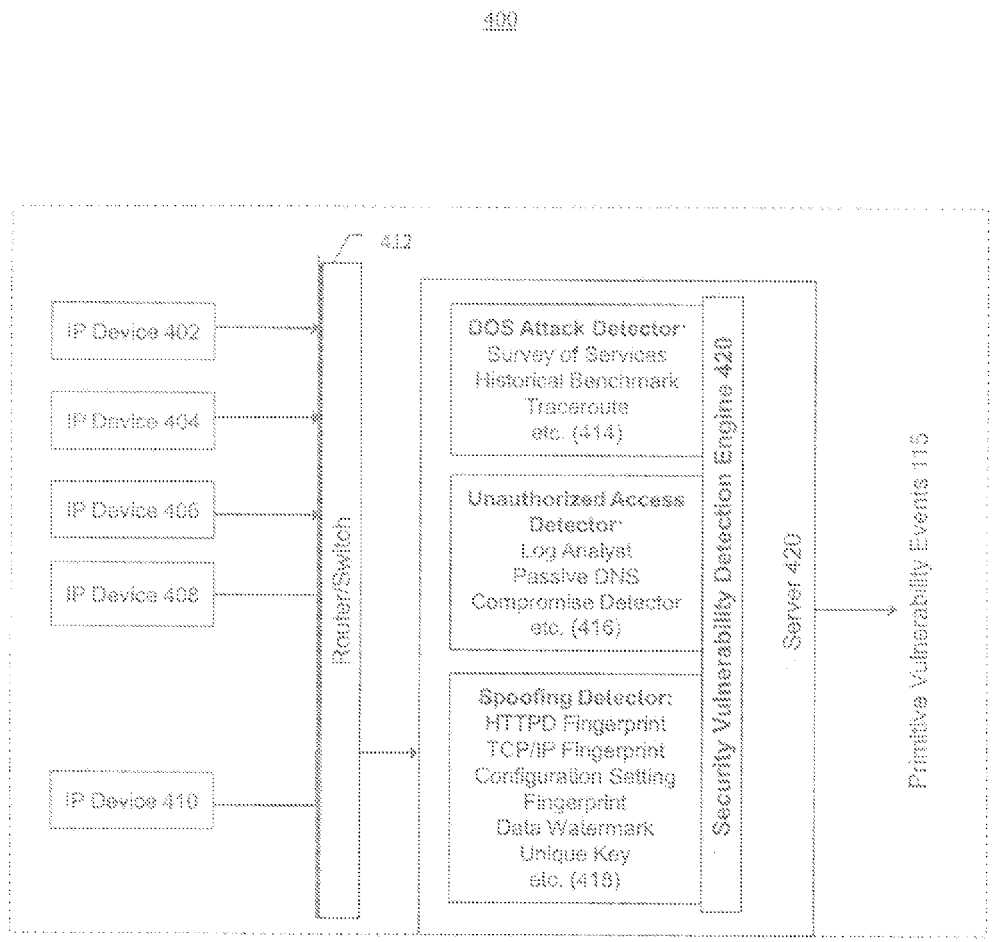
FIG. 4 illustrates a system architecture of a vulnerability detection engine according to yet another aspect of the present invention.

FIG. 4 illustrates a system architecture 400 of a vulnerability detection engine according to one embodiment of the present invention. IP Devices 402, 404, 406, 408, and 410 are connected to an IP network via a router or switch 412. Server 420, which runs Security Vulnerability Detection Engine 420 and its subsystems, also connects to the IP network via router or switch 412. One possible hardware realization for Server 420 is shown and described in relation to FIG. 8. Security Vulnerability Detection Engine 420, as described in this application for patent, has one or more subsystems for detecting one or more attack vectors. For example, as shown in FIG. 4, Security Vulnerability Detection Engine 420, has DOS Attack Detector 414, Unauthorized Access Detector 416, and Spoofing Detector 418. Each of subsystems 414, 416, and 418 may have multiple sub-components as shown in FIG. 4 and as described above. Finally, Server 420 and Security Vulnerability Detection Engine 420 generates primitive vulnerability events 115. Primitive vulnerability events 115 are processed by correlation engine 117 as described in detail above in relation to FIG. 2.

Network Management

Figure 3:
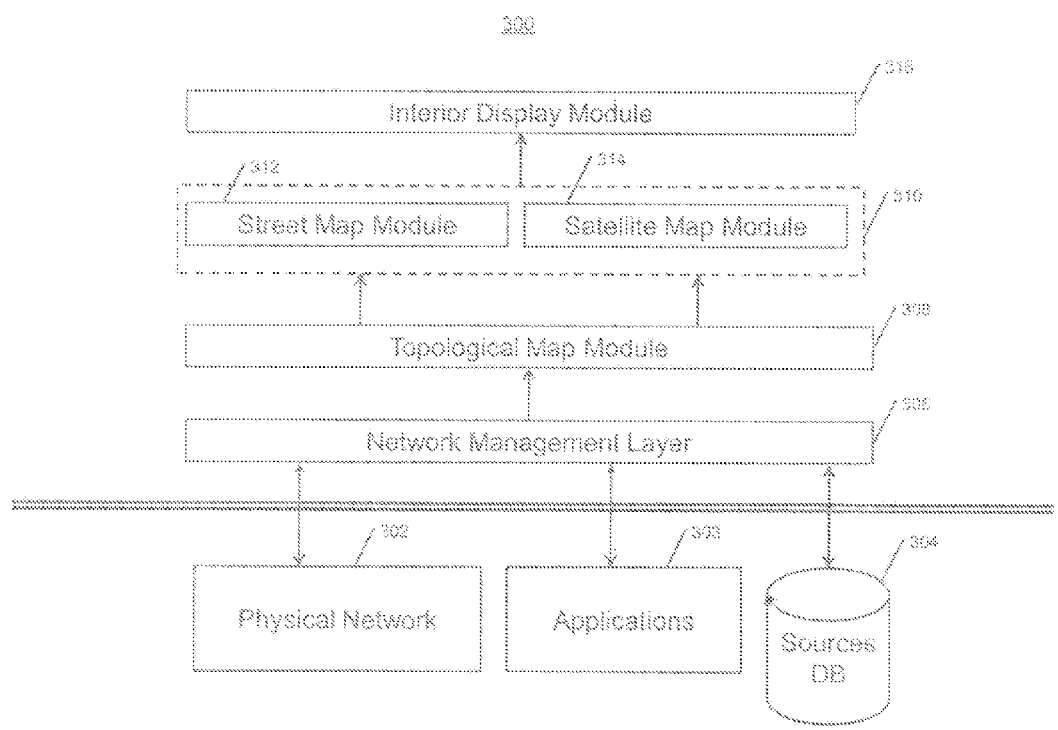
FIG. 3 illustrates a system architecture of a network management module according to another aspect of the present invention.

FIG. 3 shows an architecture of the network management module 101 according to one embodiment of the present invention. Network management layer 306 monitors the status of IP devices on the physical network 302 as well as the status of applications 303, and keeps a record of device and application status in sources database 304. Network management layer 306 detects all IP devices, including network cameras, servers, client machines, storage devices, etc. that are on the network. Topological map module 308 generates a topological network diagram (an example illustrated in FIG. 5) of all networked devices. Physical map module 310, which includes street map module 312 and satellite maps module 314, generates a physical map of the area being monitored. The physical map may be represented by a street map (as shown in FIG. 6A) or a satellite map (as shown in FIG. 6B).

In one embodiment of the present invention used to protect IP surveillance systems, all surveillance cameras and audio sensory devices (such as gunshot detectors) are displayed as icons on the physical map. "Plumes" (arcs of circles) are used to represent physical areas of coverage of the cameras, while "concentric circles" (or ellipses) are used to represent physical areas of coverage of audio devices (such as gunshot detectors). The physical area of coverage for a surveillance camera is the physical area of the facility that is within the field of view of the camera. since this value depends on resolution, as well as other camera properties (for example, a "fish-eye" camera has 180° of coverage), these values are obtained from the camera manufacturer and maintained as device "attribute data" (described below). Physical area of coverage for a gunshot detector is the physical area over which the gunshot device can accurately and reliably detect a gunshot. The physical area of coverage is obtained from the gunshot detector manufacturer and maintained as device "attribute data" (described below). Typical gunshot detectors have ranges on the order of approximately 0.25 to 1 mile radius, while typical cameras have ranges of several tens to hundreds of feet.

Figure 7:
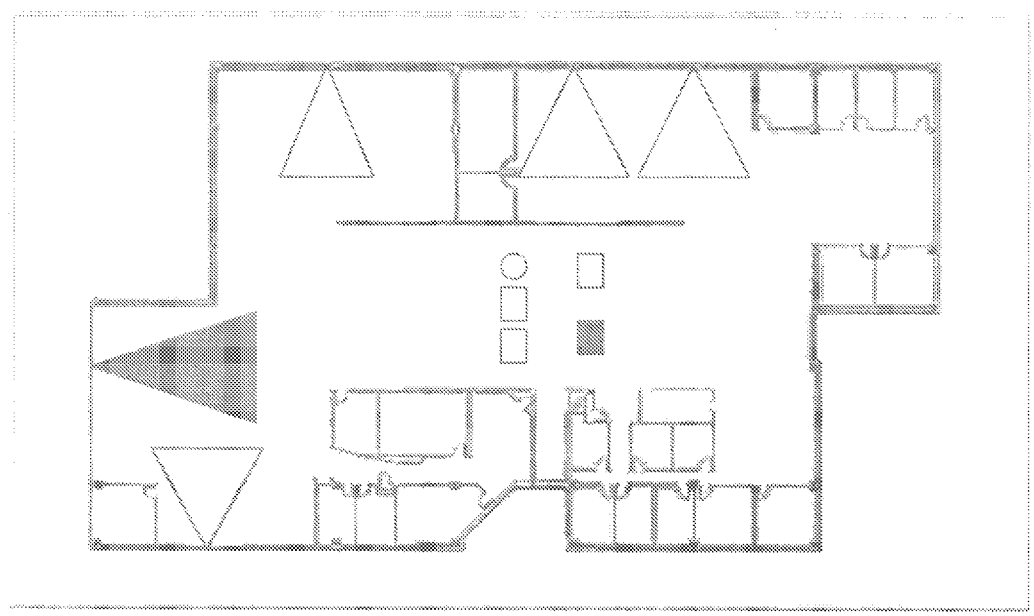
FIG. 7 illustrates another aspect of a user interface of one embodiment of the present invention.

Finally, interior display module 316 displays interiors of buildings and shows devices and areas of coverage inside buildings. Interior display module 316 is activated whenever an operator zooms into a building while in either the street view or the satellite view. The interior display module shows which interior portions of a building are covered (or not covered) by the IP devices, such as video cameras. Analogously to the street view and the satellite view, the interior display shows icons placed on the floor plan corresponding to the locations of the cameras and plumes to represent areas of coverage of the surveillance cameras. (FIG. 7 shows an example of an interior display view.)

Figure 5:
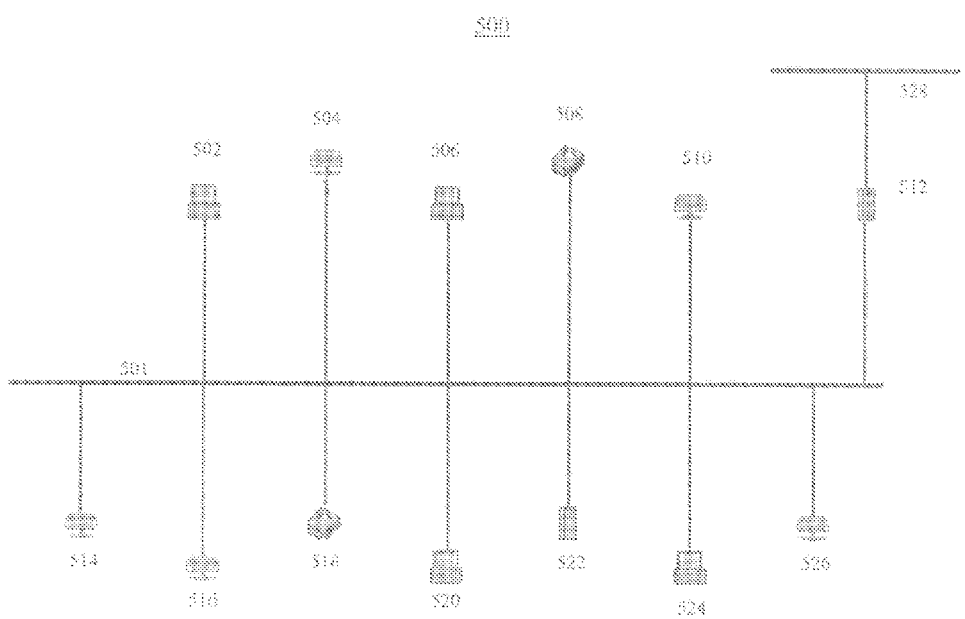
FIG. 5 illustrates one aspect of a network of devices being monitored by the present invention.
Figure 6A:
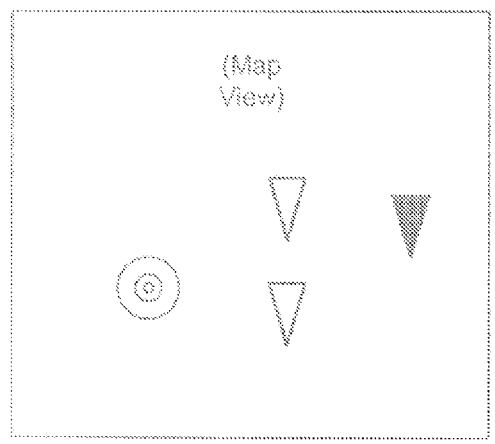
FIGS. 6A and 6B illustrates one aspect of a user interface of one embodiment of the present invention.
Figure 6B:
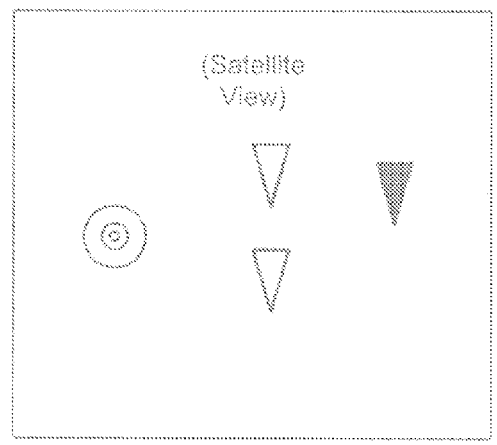

FIG. 5 shows an illustrative topological display as generated by topological map module 308 of FIG. 3. The display shows an interface to view and manage topological display of all networked devices. The display shows IP addresses of all devices, as well as any other device information, such as MIB information obtained from SNMP agents that reside on the devices. The icons also show the network status of all devices (whether the device is connected, disconnected, awake, asleep, etc.). The icons blink, change color, or in some other way indicate a disconnected device or no signal to the device. The lines connecting the devices to the backbone of the network may optionally show status of the interconnections by displaying maximum (e.g., 100 MBs, 10 MBs, etc.) and current bandwidth (whether busy, congested, free, etc.). The lines may optionally blink, change color, or otherwise indicate when there is no network connectivity and/or bandwidth is insufficient for reliable data streams.

The display automatically refreshes the view of the network and updates the display of the network. For example, if a camera is added, the refresh cycle automatically displays the new network with the new camera. Any new devices plugged into the LAN are automatically displayed on the GUI. If an existing healthy device goes off-line, then its icon is represented in a different state (for example, a healthy device in green and an off-line device in red).

FIG. 6 shows an illustrative physical map display as generated by physical map module 310 of FIG. 3. FIG. 6A shows an illustrative street map view as generated by street map module 312 of FIG. 3, while FIG. 6B shows an illustrative satellite map view as generated by satellite map module 314 of FIG. 6. The mapping data may be obtained from a mapping service, such as Google Maps® or Microsoft Virtual Earth®.

The physical map provides a configuration interface to view and manage physical locations of all cameras, gunshot devices, other IP sensory devices, storage devices, and any other IP devices and subsystems. The interface provides a mechanism to input locations of all cameras, gunshot detectors, other sensory devices, storage devices, and any other IP devices and subsystems of the network. An IP device is selected from the topological map by clicking on the icon or selecting from a list. Physical locations of the device are selected on the physical map by clicking on the physical location, by entering the street address of the device, or by entering GPS co-ordinates (latitude and longitude) of the device. The physical locations of the device are saved in the sources database 304.

Most mapping tools have good resolution up to the street or building level, but cannot zoom in past this level of detail. According to the present invention, finer detail may be shown on a floor plan, or a 3D interior map of the building. The floor plan view or 3D interior map is automatically displayed when an operator attempts to zoom into a particular building. For example, a bitmap of the building floor plan may be displayed to show camera locations inside a building when a user clicks on the building. As described previously, the interior display module 316 of FIG. 3 generates and controls the interior map. FIG. 7 shows an illustrative floor map as generated by interior display module 316. The present invention is not limited to interior display in a floor map view as shown here. The interior may also be displayed in a 3D map (not shown), or another alternative representation of the interior of a building.

Hardware Architecture

Figure 8:
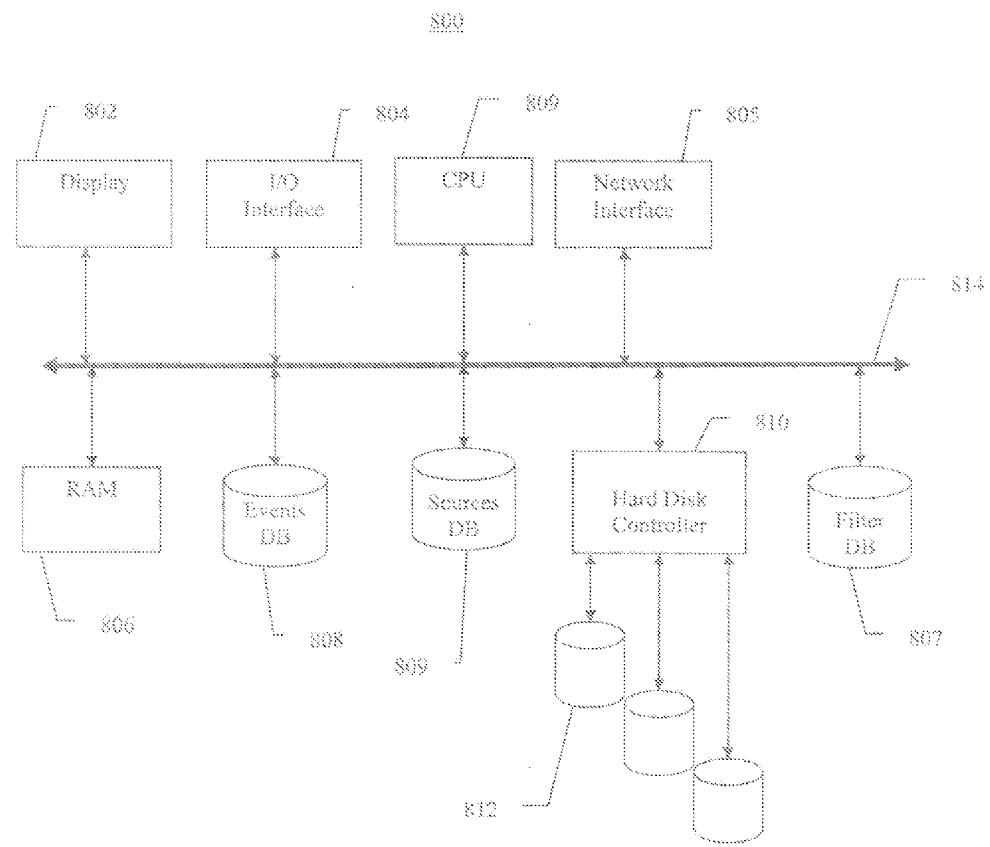
FIG. 8 illustrates an example of a hardware architecture of one embodiment of the present invention.

FIG. 8 shows an example of a hardware architecture 800 of one embodiment of the present invention. The present invention may be implemented using any hardware architecture, of which FIG. 8 is illustrative. A bus 814 connects the various hardware subsystems. A display 802 is used to present the operator interface 123 of FIG. 1. An I/O interface 804 provides an interface to input devices, such as keyboard and mouse (not shown). A network interface 805 provides connectivity to a network, such as an Ethernet network, a Local Area Network (LAN), a Wide Area Network (WAN), an IP network, the Internet, etc. (not shown in FIG. 8), to which various sensory devices may be connected (not shown). RAM 806 provides working memory while executing process 1100 of FIG. 11 and 1200 of FIG. 12. Program code for execution of process 1100 of FIG. 11 and process 1200 of FIG. 12 may be stored on a hard disk, a removable storage media, a network location, or other location (not shown). CPU 809 executes program code in RAM 806, and controls the other system components. Type I and Type II filter rules are stored in filter database 807. Events are stored in events database 808, and attribute data is stored in sources database 809. Hard disk drive controller 810 provides an interface to one or more storage media 812.

It is to be understood that this is only an illustrative hardware architecture on which the present invention may be implemented, and the present invention is not limited to the particular hardware shown or described here. It is also understood that numerous hardware components have been omitted for clarity, and that various hardware components may be added without departing from the spirit and scope of the present invention.

Figure 9:
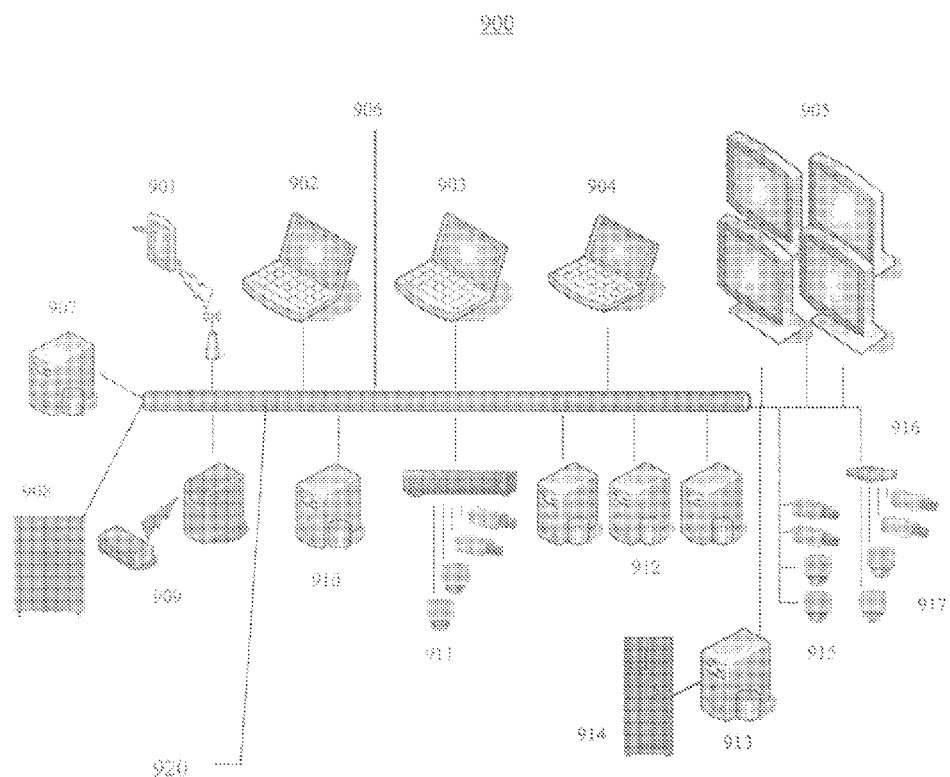
FIG. 9 shows an example of a network architecture of an IP network which can be protected from compromise according to the principles of the present invention.

FIG. 9 shows an example of a network architecture 900 of an IP network which can be protected from compromise according to the principles of the present invention. A network 920, such as an IP network over Ethernet, interconnects all system components. Digital IP cameras 915, running integrated servers that serve the video from an IP address, may be attached directly to the network. Analogue cameras 917 may also be attached to the network via analogue encoders 916 that encode the analogue signal and serve the video from an IP address. In addition, cameras may be attached to the network via DVRs (Digital Video Recorders) or NVRs (Network Video Recorders), identified as element 911. The video data is recorded and stored on data storage server 908. Data is also archived by data archive server 913 on enterprise tape library 914. Data may also be duplicated on remote storage 906 via a dedicated transmission media such as a fiber optic line, or via a public network such as the Internet.

Legacy systems, such as external security systems 909 may also be present. A central management server 910 manages the system 900, provides system administrator, access control, and management functionality. Enterprise master and slave servers 912 provide additional common system functionality. Video analytics server 907 provides the video analytics device functionality as needed.

The video, including live feeds, as well as recorded video, may be viewed on smart display matrix 905. The display matrix includes one or more monitors, each monitor capable of displaying multiple cameras or video views simultaneously. One or more clients are provided to view live video data, as well as to analyze historical video data. Supported clients include PDA 901 (such as an Apple iPhone®), central client 902, and smart client 903. A remote client 904 may be connected remotely from anywhere on the network or over the public Internet. FIG. 9 is illustrative of but one network architecture compatible with the principles of the present invention, and is not intended to limit the scope of the present invention. The present invention can be used to ensure the digital security of this IP-based video surveillance system as well as many other IP-based systems. That is, "guards the guards."

Figure 10:
FIG. 10 illustrates a flowchart of a process according to one embodiment of the present invention.

FIG. 10 shows a flowchart of a process 1000 of one embodiment of a method of detecting and alerting on security vulnerabilities in IP networks. The process 1000 begins in step 1002, as shown in FIG. 10. IP devices are monitored and primitive vulnerability events are detected as described above, as shown in step 1004. Primitive vulnerability events are normalized and filtered based on a set of rules, as shown in step 1006. Attribute data is generated based on a reliability of the IP devices, a time and frequency vulnerability events are received, as well as events external to the IP devices (such as National Terror Alerts), as shown in step 1008. Compound events are detected from one or more primitive vulnerability events, as shown in step 1010. Primitive and compound vulnerability events are correlated across time, as shown in step 1012. Primitive and compound vulnerability events are correlated across space, as shown in step 1014. One or more rules are evaluated based on the correlation performed in steps 1012 and 1014, as shown in step 1016. One or more new rules may be generated based on the correlated events (not shown in FIG. 10). Finally, one or more actions (such as alerts to designated individuals) are activated based on the evaluated rules from step 1016, as shown in step 1018. Examples of actions include turning on an IP device, rebooting an IP camera following a camera freeze, turning on the lights, etc. More examples are described below. The process ends in step 1020.

Figure 11:
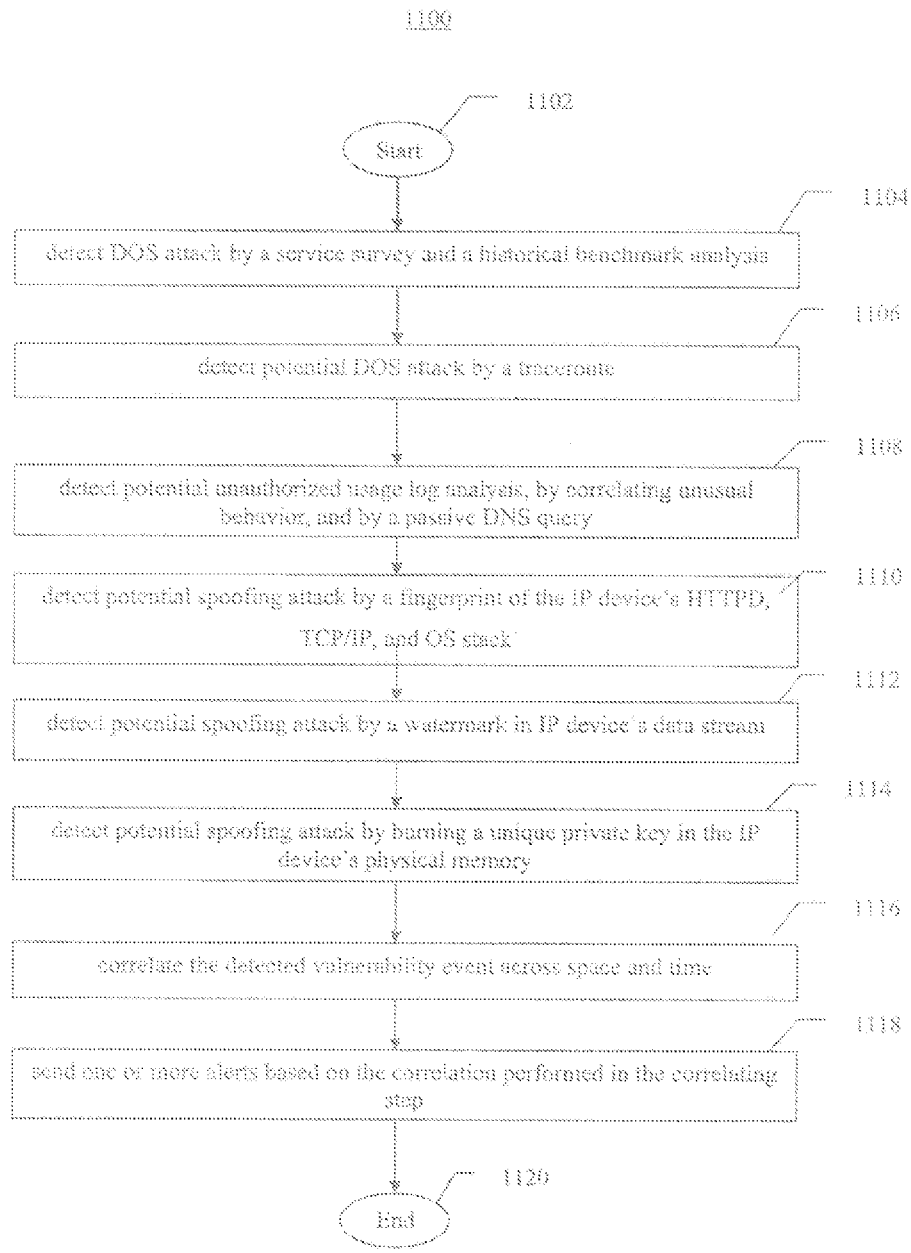
FIG. 11 illustrates another flowchart of another process according to yet another embodiment of the present invention.

FIG. 11 shows a flowchart of a process 1100 of another embodiment of a method of detecting and alerting on security vulnerabilities in IP networks. The process 1100 begins in step 1102, as shown in FIG. 11. Potential DOS attacks are detected by a service survey and a historical benchmark analysis, as described above, and as shown in step 1104. Primitive vulnerability events are normalized and filtered based on a set of rules, as shown in step 1006. Attribute data is generated based on a reliability of the IP devices, a time and frequency vulnerability events are received, as well as events external to the IP devices (such as National Terror Alerts), as shown in step 1008. Compound events are detected from one or more primitive vulnerability events, as shown in step 1010. Primitive and compound vulnerability events are correlated across time, as shown in step 1012. Primitive and compound vulnerability events are correlated across space, as shown in step 1014. One or more rules are evaluated based on the correlation performed in steps 1012 and 1014, as shown in step 1016. One or more new rules may be generated based on the correlated events (not shown in FIG. 10). Finally, one or more actions (such as alerts to designated individuals) are activated based on the evaluated rules from step 1016, as shown in step 1018. Examples of actions include turning on an IP device, rebooting an IP camera following a camera freeze, turning on the lights, etc. More examples are described below. The process ends in step 1120.

Alerts/Actions

As described above, various actions may be performed in response to a rule being activated. The alert/action engine may activate one or more actions under certain conditions defined by the rules. Some illustrative actions are listed below. However, the present invention is not limited to these particular actions, and other actions are within the scope of the present invention.

1. Send email to designated person
2. Send media-rich alert to Apple iPhone® or other multimedia hand-held device
3. Send text message (SMS) to designated phone number
4. Send text message (SMS) to mass list (e.g., all employees of a corporation)
5. Send alert to public address system
6. Call designated phone
7. Notify authorities or the police
8. Connect voice to designated person (IT director, maintenance person, security)
9. Activate electronic locks
10. Turn IP device on or off
11. Reboot IP device upon failure
12. Turn lights on or off in a designated area
13. Issue a forced alert (with automatic escalation if no response)
14. Follow a person using Pan-Zoom-Tilt (PTZ) camera
15. Follow a person from camera to camera Real-World Scenarios The following discussion illustrates just a small selection of advanced applications and real-world scenarios that may be prevented using the principles of the present invention.

In one example, a proliferation of IP devices for inspections has opened up new vulnerabilities in a traditional paper-and-pencil world. Technologies has developed an inspection tool that may be used to ensure that the maintenance and inspections of heavy industrial equipment and important real property has been properly carried out. For example, this tool can be used to ensure that cranes have been maintained daily, that windmills have been properly inspected, and that houses have been properly inspected for pests. In short, this tool is a handheld IP-addressable device that scans RFID tags and takes pictures of the object being inspected. This data is uploaded to a server, which can be accessed later for compliance and audit purposes. However, since the handheld tool is IP addressable, it is subject to the sorts of attacks detailed in this patent application. For example, a malicious individual can perform a Denial of Service attack, rendering the tool inoperable for its intended purpose—valuable inspection time is lost. More dangerous, the malicious individual may gain access to the device via one of the attack vectors described in this application for patent, and steal or otherwise modify inspection data. Worst of all, an attack may compromise the validity of the entire data by redirecting false data in place of real data ("spoofing"). All of these problems can be solved by one or more aspects of the present invention.

Any security system that involves IP cameras, or other IP sensors, such as IP-enabled swipe card readers, etc. can be compromised as described above. The cameras may be disabled, an unauthorized person can connect to the camera to view it, or a security guard may be viewing a "spoofed" image while a crime is being committed. The present invention may be used to prevent such attacks on surveillance systems themselves. provides "guards for the guards."

The biotech, biomed, and pharmaceutical companies are rapidly adopting IP-based technologies and infrastructure.

Technologies are developing a product to monitor, alert, and forensically analyze cells being incubated for biomedical research. The use of such devices by biotech companies greatly increases productivity and quality of life of researchers. However, a competitor who wants to steal intellectual property, such as trade secrets or unpublished patents, may hack these IP-based systems (many of which use IP-based cameras and other IP-sensors) via one or more of the attack vectors described in this application, to gain access to valuable competitive data. The present invention may be used to prevent such corporate espionage.

As a result of the passage of HIPPA and other state and federal regulations and cost saving measures, hospitals have instituted widespread use of electronic medical records and have connected their critical medical equipment, such as patient monitoring systems, to the Internet. However, this has opened up both historical medical records, and even live medical data, to potential malicious compromise and attack. The present invention may be used to prevent such medical data theft.

Several examples of illustrative scenarios in which the present invention could be applied were described here. However, as will be immediately recognized by one of ordinary skill, the present invention is not limited to these particular examples. The present invention can be used wherever IP networks are vulnerable to attack.

Alternative Embodiments

In one embodiment, a system administrator may set the rules. The system administrator may hold an ordered, procedural workshop with the users and key people of the organization using the present invention to determine which primitive vulnerability events to detect, which compound events to detect, what weighing criteria (attribute data) to assign to devices, and what alerting thresholds to use, as well as who should receive which alerts.

In another embodiment, the rules may be heuristically updated. For example, the rules may be learned based on past occurrences. In one embodiment, a learning component may be added which can recognize missing rules. If an alert was not issued when it should have been, an administrator of the system may note this, and a new rule may be automatically generated.

In one embodiment of the present invention, several user interfaces may be provided. For example, a user interface may be provided for an administrator, who can modify various system parameters, such as the primitive vulnerability events being detected and recorded, the compound events and their definition in terms of primitive events, the attribute data, the rules, the thresholds, as well as the action components, alert destinations, contact lists, and group lists. Another user interface may be provided for an officer, such as a security guard, to monitor the activity of the system. For example, a user interface for the IT security officer would allow the officer to monitor alerts system-wide, turn on and off appropriate IP devices, and notify authorities. An interface may also be provided for an end-user, such as an executive. The interface for the end-user allows, for example, the end-user to monitor those alerts relevant to him or her, as well as to view those data streams they have permission to view. Various user interfaces may be created for various users of the present invention, and the present invention is not limited to any particular user interface shown or described here.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention, as defined in the appended claims.

What is claimed is:

1. A vulnerability detection and alerting system for detecting compromise of one or more internet protocol (IP) devices on an IP network, the system comprising:
   a detector configured to detect one or more primitive vulnerability events in the IP devices; and
   an attribute engine configured to generate attribute data representing information about an importance of the IP devices,
   wherein the attribute data has an associated weighting function, and the primitive vulnerability events are weighted according to the attribute data corresponding to one of the IP devices that generated the primitive vulnerability events,
   wherein the attribute data comprises quality of data produced by the IP devices, age of the IP devices, time since last maintenance of the IP devices, integrity of the IP devices, and reliability of the IP devices.

2. A method of detecting and alerting on possible compromise of an internet protocol (IP) network having one more IP devices, comprising:
   detecting at least one potential denial of service attack as a first set of vulnerability events;
   detecting at least one potential unauthorized usage attempt as a second set of vulnerability events;
   detecting at least one potential spoofing attack as a third set of vulnerability events, wherein the detecting of the at least one potential spoofing attack comprises watermarking of data streams of the IP devices;
   analyzing the first set of vulnerability events, the second set of vulnerability events, and the third set of vulnerability events weighted according to attribute data representing information about an importance of the IP devices that generated the events; and
   sending one or more alerts based on the analysis performed in the analyzing step,
   wherein the attribute data comprises quality of data produced by the IP devices, age of the IP devices, time since last maintenance of the IP devices, integrity of the IP devices, and reliability of the IP devices.

3. The method of claim 2, wherein the denial of service attack is detected by a service survey.

4. The method of claim 2, wherein the denial of service attack is detected by a historical benchmark analysis.

5. The method of claim 2, wherein the denial of service attack is detected by a tracer route.

6. The method of claim 2, wherein the unauthorized usage is detected by a passive DNS query.

7. A system for detecting and alerting on possible compromise of an internet protocol (IP) network having one or more IP devices, the system comprising:
   a vulnerability detection engine configured to detect one or more vulnerabilities in the IP network;
   an analysis engine configured to analyze two or more vulnerabilities weighted according to attribute data representing information about an importance of the IP device, wherein the analysis engine is further configured to correlate the vulnerabilities across time and space; and an action engine configured to perform one or more actions based on the correlation performed by the analysis engine, wherein the attribute data comprises quality of data produced by the IP devices, age of the IP devices, time since last maintenance of the IP devices, integrity of the IP devices, and reliability of the IP devices.

8. The system of claim 7, wherein the vulnerability detection engine comprises: means for detecting at least one potential denial of service attack.

9. The system of claim 7, wherein the denial of service attack is detected by a service survey.

10. The system of claim 7, wherein the denial of service attack is detected by a historical benchmark analysis.

11. The system of claim 7, wherein the denial of service attack is detected by a tracer route.

12. The system of claim 7, wherein the unauthorized usage is detected by a passive DNS query.

* * * * *